United States Patent
Kessler

(10) Patent No.: US 10,061,129 B2
(45) Date of Patent: Aug. 28, 2018

(54) BIREFRINGENT OCULAR FOR AUGMENTED REALITY IMAGING

(71) Applicant: David Kessler, Rochester, NY (US)

(72) Inventor: David Kessler, Rochester, NY (US)

(73) Assignee: Kessler Optics and Photonics Solutions Ltd., Rochester, NY (US)

( * ) Notice: Subject to any disclaimer, the term of this patent is extended or adjusted under 35 U.S.C. 154(b) by 14 days.

(21) Appl. No.: 15/058,312

(22) Filed: Mar. 2, 2016

(65) Prior Publication Data

US 2016/0377867 A1 Dec. 29, 2016

Related U.S. Application Data

(60) Provisional application No. 62/133,433, filed on Mar. 15, 2015.

(51) Int. Cl.
 *G02B 27/01* (2006.01)
 *G02B 5/30* (2006.01)
 *G02F 1/1335* (2006.01)

(52) U.S. Cl.
 CPC ....... *G02B 27/0172* (2013.01); *G02B 5/3083* (2013.01); *G02B 27/0176* (2013.01); *G02F 1/133528* (2013.01); *G02B 2027/013* (2013.01); *G02B 2027/015* (2013.01); *G02B 2027/0123* (2013.01); *G02B 2027/0127* (2013.01); *G02B 2027/0132* (2013.01); *G02F 2001/13355* (2013.01); *G02F 2001/133548* (2013.01)

(58) Field of Classification Search
 CPC .............. G02B 27/0101; G02B 27/017; G02B 27/0172; G02B 2027/0123; G02B 2027/0127; G02B 2027/0132; G02B 2027/0134; G02B 5/3083

USPC ..................... 359/13, 14, 480, 482, 629–634
See application file for complete search history.

(56) References Cited

U.S. PATENT DOCUMENTS

| 3,563,632 A | 2/1971 | Schmidt | |
| 3,758,201 A * | 9/1973 | MacNeille | A61B 3/02 351/159.56 |
| 5,142,411 A | 8/1992 | Fiala | |

(Continued)

FOREIGN PATENT DOCUMENTS

| WO | WO 2012175939 A1 * | 12/2012 | ......... G02B 27/2264 |
| WO | WO2015/134740 | 9/2015 | |
| WO | WO2015/186010 | 12/2015 | |

OTHER PUBLICATIONS

Love et al. "High-speed switchable lens enables the development of a volumetric stereoscopic display" Opt Express. Aug. 31, 2009; 17(18): 15716-15725.*

*Primary Examiner* — Nicholas R Pasko
(74) *Attorney, Agent, or Firm* — Louis S. Horvath

(57) ABSTRACT

A display apparatus has a birefringent ocular having a first index of refraction for light having a first polarization axis and a second index of refraction, lower than the first index by at least 0.1, for light having a second polarization axis that is orthogonal to the first polarization axis, wherein the birefringent ocular defines an eye box for a viewer. An image source emits image-bearing light having the first polarization axis. A polarization beam splitter is disposed to reflect the image-bearing light of the first polarization axis toward the birefringent ocular and further disposed to transmit, from an object scene, light having the second polarization axis.

16 Claims, 9 Drawing Sheets

(56) References Cited

U.S. PATENT DOCUMENTS

| | | | | |
|---|---|---|---|---|
| 5,886,822 A * | 3/1999 | Spitzer | G02B 27/0172 | 359/630 |
| 5,982,343 A * | 11/1999 | Iba | G02B 27/0172 | 345/8 |
| 6,061,103 A * | 5/2000 | Okamura | G02B 27/017 | 345/32 |
| 6,222,677 B1 * | 4/2001 | Budd | G02B 27/0172 | 359/630 |
| 6,243,199 B1 * | 6/2001 | Hansen | G02B 5/3058 | 359/485.05 |
| 6,400,493 B1 * | 6/2002 | Mertz | G02B 27/0172 | 359/301 |
| 6,525,699 B1 * | 2/2003 | Suyama | G02B 27/2278 | 345/419 |
| 6,839,181 B1 * | 1/2005 | Cobb | G02B 5/3058 | 348/E9.027 |
| 7,053,865 B2 * | 5/2006 | Takahashi | G02B 27/225 | 345/7 |
| 7,417,617 B2 * | 8/2008 | Eichenlaub | G02B 3/005 | 345/102 |
| 8,705,177 B1 * | 4/2014 | Miao | G02B 27/0172 | 345/8 |
| 9,632,312 B1 * | 4/2017 | Cakmakci | G02B 27/017 | |
| 2008/0252846 A1 | 10/2008 | Biver et al. | | |
| 2012/0013988 A1 * | 1/2012 | Hutchin | G02B 27/0172 | 359/631 |
| 2012/0113092 A1 | 5/2012 | Bar-Zeev et al. | | |
| 2013/0222896 A1 * | 8/2013 | Komatsu | G02B 17/0848 | 359/365 |
| 2013/0271763 A1 * | 10/2013 | Li | G01N 21/8806 | 356/365 |
| 2015/0177519 A1 * | 6/2015 | Cakmakci | G02B 27/0172 | 359/631 |
| 2015/0208914 A1 * | 7/2015 | Love | A61B 3/028 | 351/232 |
| 2017/0115484 A1 * | 4/2017 | Yokoyama | G02B 27/0101 | |

\* cited by examiner

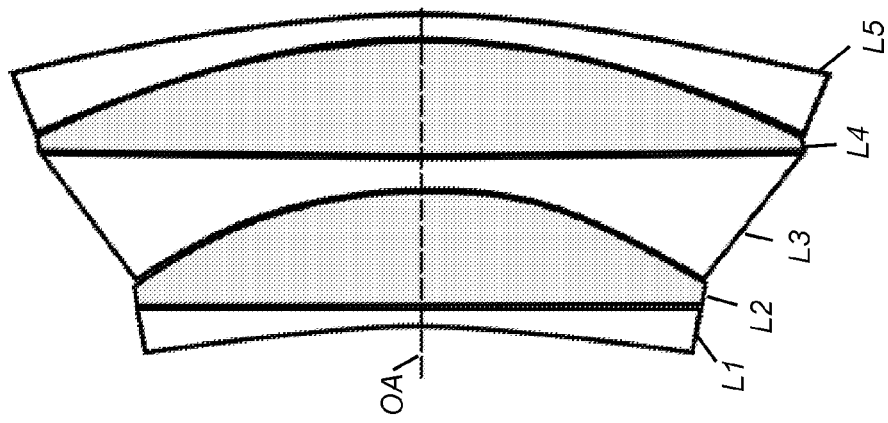

SURFACE DATA SUMMARY:

| Surf | Type | Radius | Thickness | Glass | Diameter |
|---|---|---|---|---|---|
| OBJ | STANDARD | Infinity | -1400 | | 1398.923 |
| 1 | STANDARD | Infinity | -100 | | 97.92816 |
| STO | NONSEQCO | Infinity | 0 | | 6.124808 |
| 3 | STANDARD | Infinity | -80 | | 79.34256 |
| 4 | STANDARD | Infinity | 15 | | 6.124808 |
| 5 | EVENASPH | 782.1269 | 0.7 | PMMA | 19.4 |
| 6 | STANDARD | Infinity | 4 | CALCITE | 20 |
| 7 | STANDARD | -17.07066 | 1 | PMMA | 20 |
| 8 | EVENASPH | 340.9744 | 4 | CALCITE | 27 |
| 9 | EVENASPH | -28.40657 | 0.7 | PMMA | 26.8 |
| 10 | EVENASPH | -64.92773 | 25 | | 29 |
| 11 | COORDBRK | – | 0 | | – |
| 12 | STANDARD | Infinity | 0 | MIRROR | 58.38988 |
| 13 | COORDBRK | – | -31.70267 | | – |
| 14 | PARAXIAL | – | 0.1 | | 50.70752 |
| IMA | STANDARD | Infinity | | | 2 |

*FIG. 3A*

SURFACE DATA SUMMARY:

| Surf | Type | Radius | Thickness | Glass | Diameter |
|---|---|---|---|---|---|
| OBJ | STANDARD | Infinity | -1400 | | 1398.923 |
| 1 | STANDARD | Infinity | -100 | | 97.92816 |
| STO | NONSEQCO | Infinity | 0 | | 6.124808 |
| 3 | STANDARD | Infinity | -80 | | 79.34256 |
| 4 | STANDARD | Infinity | 15 | | 6.124808 |
| 5 | EVENASPH | 782.1269 | 0.7 | PMMA | 19.4 |
| 6 | STANDARD | Infinity | 4 | CALCITE-E | 20 |
| 7 | STANDARD | -17.07066 | 1 | PMMA | 20 |
| 8 | EVENASPH | 340.9744 | 4 | CALCITE-E | 27 |
| 9 | EVENASPH | -28.40657 | 0.7 | PMMA | 26.8 |
| 10 | EVENASPH | -64.92773 | 25 | | 29 |
| 11 | COORDBRK | - | 0 | | - |
| 12 | STANDARD | Infinity | 0 | | 98.7587 |
| 13 | COORDBRK | - | 0 | | - |
| 14 | PARAXIAL | - | 57.6 | | 48.24438 |
| IMA | STANDARD | Infinity | | | 2 |

*FIG. 3B*

BIREFRINGENT OCULAR FOR AUGMENTED REALITY IMAGING

CROSS REFERENCE TO RELATED APPLICATIONS

This application claims the benefit of U.S. Provisional application U.S. Ser. No. 62/133,433, provisionally filed on 15 Mar. 2015, entitled "Stereoscopic display using birefringent ocular" in the name of David Kessler, incorporated herein by reference in its entirety.

FIELD OF THE INVENTION

This invention generally relates to display apparatus and more particularly relates to an augmented imaging apparatus that display a virtual image and the object scene that is in the observer's field of view.

BACKGROUND OF THE INVENTION

Wearable display optics are commercialized for use in a range of applications, such as military, entertainment, and industrial applications. Virtual Reality (VR) systems, such as the OCULUS RIFT(TM) VR device familiar to those knowledgeable about VR systems, provide an immersive, digitally generated display with a sizable field of view (FOV). VR devices are particularly popular in gaming applications.

In order to provide superimposed image content in the FOV, AR systems employ some type of combiner element. The combiner is commonly the optical element that is positioned closest to the eye, at a distance from the eye termed the "eye relief". The balance of the optical elements of the AR display are then forced forward, further away from the eye, in order to clear the combiner. One combiner approach, for example, uses a curved, off-axis, semi-transparent mirror. While this arrangement has some advantages for forming virtual images, the display FOV is constrained in size and performance, largely due to the need for optics separation from the eye and due to the off-axis angles that are used.

By comparison with AR optical systems, VR systems that do not use a combiner can have sizable field of view. The OCULUS RIFT VR system referred to previously had originally consisted of a display similar to that used for a smartphone, with a suitable eyepiece or ocular. The eyepiece is centered on the display so that the system does not suffer off-axis aberrations comparable to those found in conventional AR systems.

Among challenges for augmented reality (AR) imaging are providing a wide field of view and good image quality for display content, such as the OCULUS RIFT VR system exhibits, with the additional capability for viewing the object scene without cumbersome constraints of earlier AR designs for providing the needed eye relief.

SUMMARY OF THE INVENTION

It is an object of the present invention to advance the art of augmented reality image display. With this object in mind, the present invention provides a display apparatus comprising:
 a) a birefringent ocular having a first index of refraction for light having a first polarization axis and a second index of refraction, lower than the first index by at least 0.1, for light having a second polarization axis that is orthogonal to the first polarization axis, wherein the birefringent ocular defines an eye box for a viewer;
 b) an image source that emits image-bearing light having the first polarization axis;
 and
 c) a polarization beam splitter disposed to reflect the image-bearing light of the first polarization axis toward the birefringent ocular and further disposed to transmit, from an object scene, light having the second polarization axis.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present disclosure, it is believed that the invention will be better understood from the following description when taken in conjunction with the accompanying drawings.

FIG. 2A is a side view showing the arrangement of a birefringent ocular according to an embodiment of the present disclosure.

FIG. 3A shows a table for a design sample with surface data summary for the object scene light channel.

FIG. 3B shows a table for a design sample with surface data summary for the virtual imaging light channel.

DETAILED DESCRIPTION OF THE INVENTION

Figure 1A:
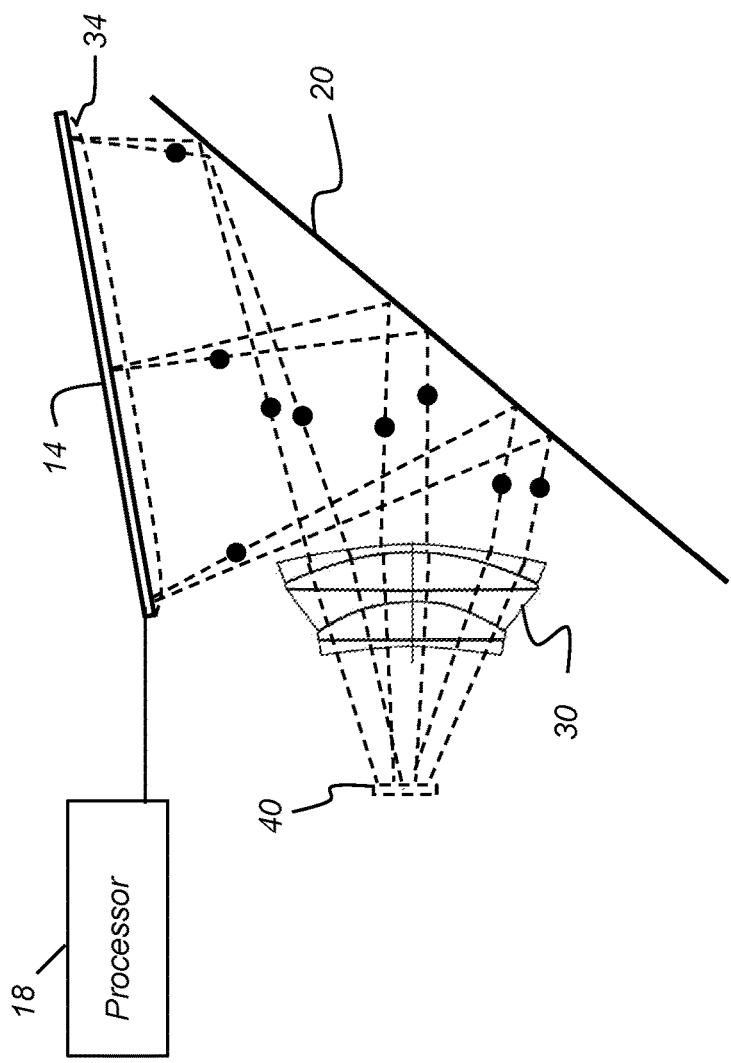
FIG. 1A is a schematic diagram that shows an augmented reality imaging apparatus with the path for light that forms a virtual image shown in dashed lines.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another.

The term "oblique" or "oblique angle" has its conventional meaning, as relating to an angular relationship that is either greater than or less than a right (90 degree) angle and not parallel with respect to its reference, that is, not an integer multiple of 90 degrees. An oblique angle is considered to be an angle that differs from the nearest multiple of 90 degrees by more than 4 degrees.

Two geometric features, such as lines or planes, are considered to be substantially parallel if they are parallel to within 4 degrees or less. Two geometric features, such as lines or planes, are considered to be substantially orthogonal if they are orthogonal to within 4 degrees or less.

The term "optical axis" has its conventional meaning for each of the embodiments described subsequently. With rotationally symmetrical optics, the optical axis simply corresponds to the axis of rotational symmetry. However, with asymmetric optics, the optical axis is more generally defined as the path taken by a ray that is centered in the aperture of the light-concentrating optical component. For cylindrical optics, there may be an axis of symmetry with respect to a plane; this may or may not correspond to the optical axis. With a cylindrical optical device, the optical axis is in the plane where there is perceptible optical power orthogonal to the direction along which the cylindrical device is extended. For clarity, the term optical axis is used in the following description as relative to a single refractive or reflective optical component, rather than relative to the larger optical system that comprises multiple components. The more general term "optical path" is used herein to describe the path taken by a particular beam of light, from one component to the next in the optical system of the present disclosure.

"Free-form" optical surfaces include surfaces of various shapes, wherein the surfaces are not surfaces of revolution.

In the context of the present disclosure, the terms "viewer", "operator", "observer", and "user" are used equivalently to refer to the person who wears the HMD or other wearable augmented imaging device.

In the context of the present disclosure, the term "left eye image" describes a virtual image that is viewed by the left eye of the viewer and a "right eye image" describes a corresponding virtual image that is viewed by the right eye of the viewer. The phrases "left eye" and "right eye" may be used as adjectives to distinguish imaging components for forming each image of a stereoscopic image pair, as the concept is widely understood by those skilled in the stereoscopic imaging arts.

With relation to dimensions given herein, the term "substantially" means within better than +/−12% of a geometrically exact dimension. Thus, for example, a first dimensional value is substantially half of a second value if it is in the range of from about 44% to about 56% of the second value. Positions in space are "near" each other or in close proximity when, relative to an appropriate reference dimension such as a radius of curvature, a focal point, a component location, or other point on an optical axis, distance dimensions are substantially the same, no more than about 12% apart, preferably within 5% or 1% or less distance from each other.

As an alternative to real image projection, an optical system can form a virtual image for display. In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

The terminology "S-polarization" and "P-polarization", familiar to those skilled in the optical arts, relates to the plane in which the electric field of a light wave oscillates and to the surface upon which the light is incident. Light having P-polarization, or "P-polarized" light, has its polarization in the meridional plane. Light having S-polarization, or "S-polarized" light, has its polarization perpendicular to the meridional plane, wherein the meridional plane is the plane that contains the surface normal and the propagation vector of the incoming and outgoing light radiation. In general, S-polarization is more highly reflected than P-polarization. Polarization beam splitters (PBS), also termed polarizing beam splitters, are commonly designed to commonly reflect light having S-polarization and transmit light having P-polarization, although it is possible to design and implement PBS coatings that exhibit the opposite behavior.

Figure 1B:
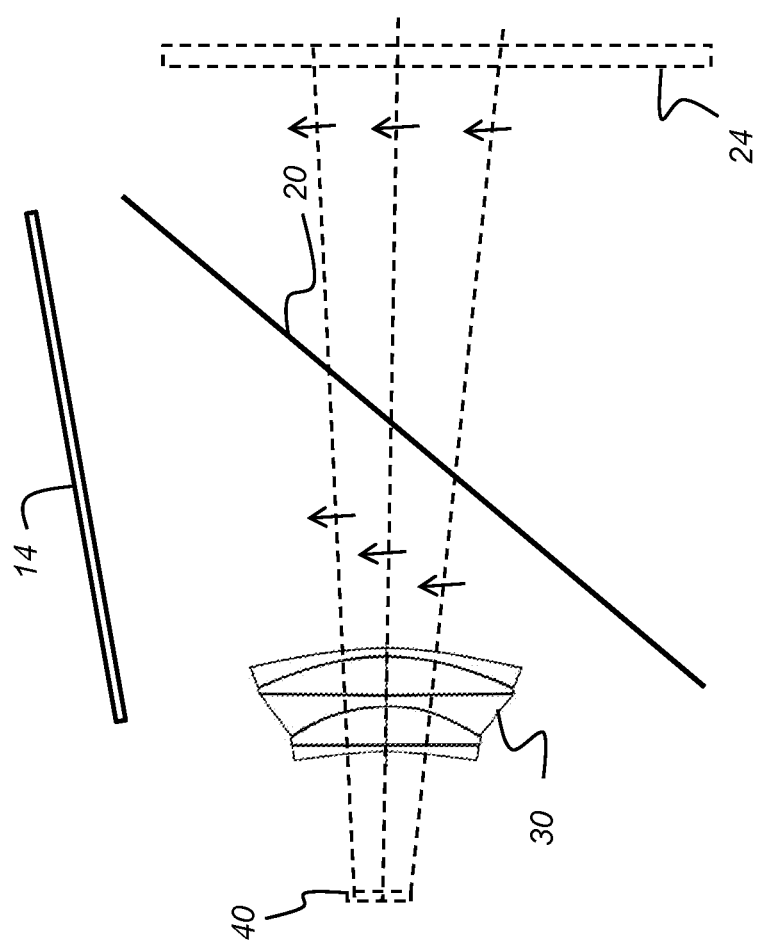
FIG. 1B is a schematic diagram that shows an augmented reality imaging apparatus with the path for light that forms a real image shown in dashed lines.

Augmented Reality (AR) applications combine virtual image and real-world object scene content from the observer's field of view (FOV) and can even superimpose synthetic virtual image content onto the real-world FOV. An embodiment of the present disclosure provides AR imaging using polarization to provide suitable paths for light from the object scene and from a digital electronic display. Referring to the schematic diagram of FIGS. 1A and 1B, an augmented imaging apparatus 10 combines virtual and real image content using a polarization beam splitter PBS 20 that reflects light of a first polarization and transmits light of a second, orthogonal polarization. A combined pupil is formed at an eyebox 40, at the approximate position of the viewer's cornea. FIG. 1A traces the path of light from the digital electronic display that forms the virtual image. FIG. 1B traces the path of light from the object scene that provides a real image. AR imaging is provided by combining the light paths of FIGS. 1A and 1B.

For the virtual image light channel in FIG. 1A, the virtual image is generated by a display 14 as the image source. Display 14 is in signal communication with a control logic processor 18 and directs light of a first polarization toward a polarization beam splitter (PBS) 20, functioning as a combiner. PBS 20 reflects light of the first polarization toward a birefringent ocular 30, a compound lens that serves as an eyepiece for the optical system and exhibits different focusing behavior for light of orthogonal polarizations, as described in more detail subsequently. For light from display 14, that is, light having the first polarization state, ocular lens 30 has significant power and provides a focal length in a range between about 20 and 70 mm. A suitable range according to one embodiment is a focal range of 40-45 mm, for example. The generated virtual image to the eye at eye box 40 appears as if it is at infinity focus, so that this virtual image visually combines with the real image from the object scene.

Additional lenses can be used in the virtual image channel of FIG. 1A, such as an optional field lens 34 placed in proximity to the display 14. Similarly, additional light-conditioning optics can be provided for the generated light in the light path between display 14 and combiner 30.

For the object scene or "real image" light channel in FIG. 1B, also considered the "see-through channel", PBS 20 transmits light of the second polarization, its polarization axis orthogonal to the polarization axis for light of the first polarization as previously described. For light of the second polarization state, ocular lens 30 has essentially zero power, that is, has no perceptible power and acts as a "null" lens. The light from the object scene FOV simply passes through ocular lens 30 and proceeds to eyebox 40, without magnification. An optional polarizer 24 can be provided in the path of light from the object scene, as shown in FIG. 1B.

According to an embodiment of the present disclosure, as noted in the schematic diagram of FIG. 1A, the virtual image content uses light having S-polarization (conventionally indicated using dots). The object scene light has P-polarization (indicated using arrows). Thus, PBS 20 reflects light of S-polarization and transmits P-polarization. Birefringent ocular lens 30 has perceptible optical power for light having S-polarization state and exhibits zero power for light of P-polarization. This behavior is generally favorable for glare reduction as is the case for polarizing sunglasses, since reflected light from wet surfaces is highly polarized. It can be appreciated by those skilled in the optical arts that the opposite behavior could be used, with appropriate changes to component design, so that display 14 instead generates light of the orthogonal (P−) polarization and object scene content has S-polarization; PBS 20 and lens 30 behavior would also change accordingly.

According to an alternate embodiment of the present disclosure, the object scene light channel can have slight optical power, with considerably larger focal length than that provided in the virtual image light channel for display 14. Thus, for example, in an application for glasses or goggles, it may be useful to provide magnification for focus of objects within 1 meter of the viewer (1 diopter) or less. The ocular lens 30 magnification for the polarization state of the virtual imaging channel provides at least three times the lens magnification for the polarization state of the object scene channel.

Display 14 can be any of a number of types of emissive display, including an organic light-emitting diode (OLED) array, for example. Still other types of display device that can be used include liquid crystal device (LCD) displays, a digital micromirror array with a scanned light source, or other display type. The display 14 can be essentially flat or may be curved spherically or cylindrically to help correct for field curvature. In particular, the display 14 can be curved in order to better fit the Petzval curvature of the ocular.

PBS 20 can be a wire grid polarizer. Wire grid polarizers are manufactured, for example, by Moxtek, Orem, Utah. Alternately, PBS 20 can be a conventional polarization beam splitter formed using thin-film design. PBS 20 is flat in the embodiments shown herein, but can alternately be on a curved surface.

Ocular Lens 30

As described previously with respect to FIGS. 1A and 1B, birefringent ocular lens 30 exhibits different behavior with respect to incident light, depending on the polarization state. Significant magnification is provided to light of one polarization state; light of the orthogonal polarization state can be only slightly magnified or may be essentially transmitted without optical power applied by lens 30.

Figure 2B:
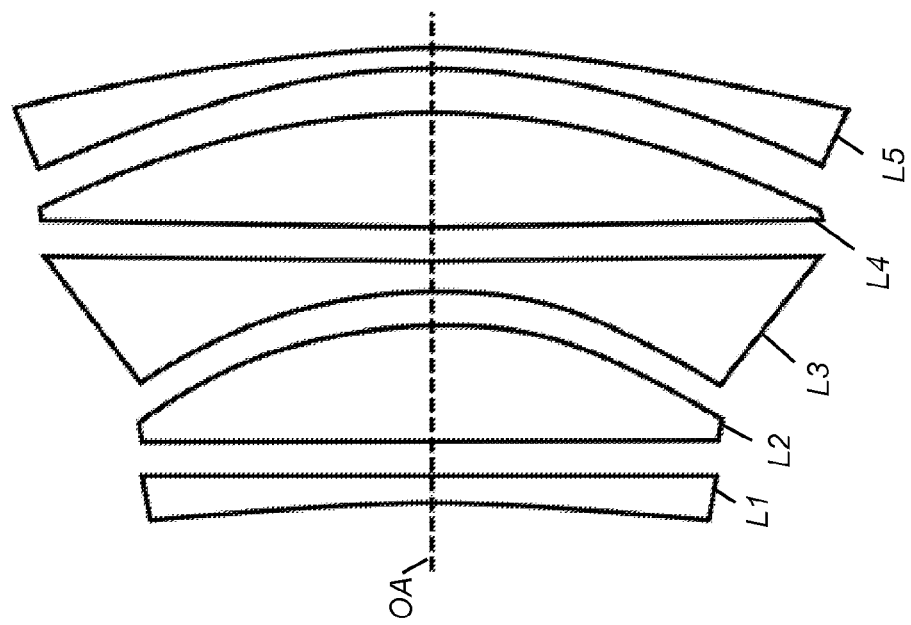
FIG. 2B shows an exploded view of the compound ocular lens.

The side view of FIG. 2A shows an arrangement of ocular lens 30 according to an embodiment of the present disclosure. FIG. 2B shows an exploded view of compound ocular lens 30. Ocular lens 30 is formed from segments L1, L2, L3, L4, and L5, bonded together to form a single compound lens. Lens segments L2 and L4 are formed of calcite or other birefringent crystal. Lens segments L1, L3, and L5 are plastic lenses bonded to surfaces of lens segments L2 and L4. According to an embodiment, lenses are bonded together using a suitable optical adhesive to sandwich the calcite lens segments L2 and L4 between plastic lens segments L1, L3, and L5. According to an alternate embodiment, plastic lens segments L1, L3, and L5 are molded directly over the corresponding crystalline lens segments L2 and L4. Lenses L1, L3, and L5 can alternately be glass lenses.

According to an embodiment of the present disclosure, lens segments L1, L2, L3, L4, and L5 are circularly symmetric. This provides high performance optics without the cost and complexity of components that do not have circular symmetry.

The arrangement shown in FIG. 2A can be particularly favorable for a lens construction when using calcite or other crystalline lens segments. Crystalline materials are generally fairly fragile and do not polish well, tending to cleave readily when polished or handled, with separation according to the crystalline plate structure. Even after polishing, calcite lenses can be easily damaged if exposed to rough handling or contact. The FIG. 2A arrangement encases calcite segments L2, L4 surfaces in plastic material, protecting the lenses from casual contact and providing a measure of stability to the lens structure. An additional anti-reflection (AR) coating can be provided along each lens surface and interface to help control reflection between crystalline and plastic surfaces.

The front and back surfaces of ocular 30, that is, the outer surfaces of lens segments L1 and L5, can be aspheric surfaces. Ocular 30 can be centered along the optical axis OA.

Any suitable birefringent crystal material that provides ordinary and extraordinary axes according to light polarization can be used for fabrication of lens segments L2 and L4. Birefringent crystals suitable for optical applications include calcite, rutile, and neodymium-doped yttrium orthovanadate (Nd:YVO$_4$). The crystal can be uniaxial, with the crystalline axis substantially horizontal or vertical, that is horizontal or vertical to within +/−4 degrees. According to an embodiment, the crystal e-axis is substantially vertical.

For example, with calcite, a uniaxial crystal, the crystalline axis is in the vertical (extraordinary) direction; the index in this direction is approximately 1.48, very close to the index for PMMA. With respect to the viewer, there is no perceptible power for the polarization axis in this direction. According to an embodiment, the ordinary refractive index for the crystalline lens segments is within 0.05 of the refractive index for the plastic or glass lens segments. For light polarized orthogonally to the axis, the index is about 1.65. Thus, with a difference of 0.17 in index of refraction between polarization axes, there is significant power for a curved surface for light with polarization along this orthogonal direction. For most designs, an index difference of at least about 0.1 between light with orthogonal polarization axes allows for substantial difference in optical power of the lens segments L2 and L4.

Alternately, a liquid crystal material can be used to provide AR imaging, with the liquid crystal material sandwiched between a flat surface and a Fresnel surface.

Suitable plastics for lens segments L1, L3, and L5 include poly(methyl methacrylate) PMMA, polyester (OKP and OKP4HT), and other optical plastics having suitable refractive index. The refractive index range for the plastic material can be close to the refractive ordinary and extraordinary indices for the birefringent material of lens segments L2 and L4, such as between the index values of the birefringent crystal for each orthogonal polarization state. Alternately, the refractive index for the plastic can be the same as that of the crystal for polarized light from the object field (shown as P-polarized light in FIG. 1B), in order to reduce e-surface reflection.

The table in FIG. 3A shows a surface data summary for the virtual imaging light channel traced in FIG. 1A. Calcite is the crystal material in the FIG. 3A example. The table in FIG. 3B shows a surface data summary for the object scene light channel traced in FIG. 1B. Calcite-E is the crystal material in the FIG. 3B example. (Calcite and Calcite-E have different indices of refraction.)

Figure 4:
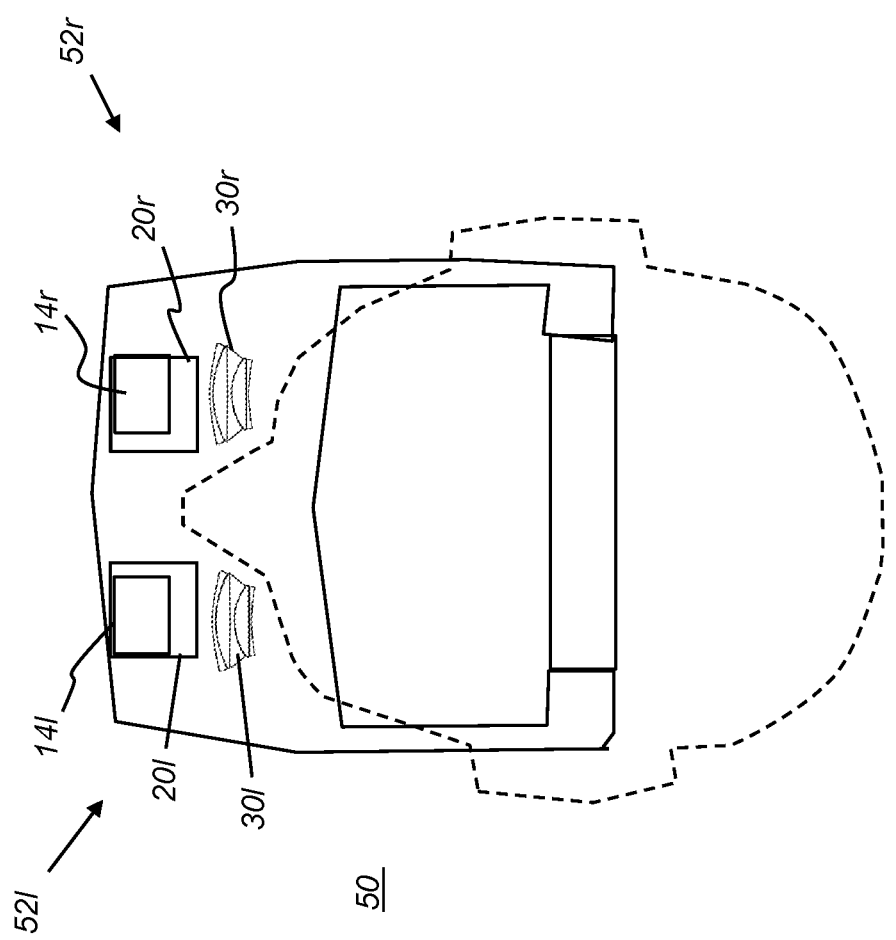
FIG. 4 is a top view showing an HMD having an augmented reality imaging apparatus with a birefringent ocular for each eye.

FIG. 4 is a top view showing an HMD 50 for stereoscopic viewing having an augmented reality imaging apparatus with a birefringent ocular for each eye. Left eye imaging apparatus 52l has a corresponding display 14l, PBS 20l, and ocular lens 30l.

Similarly, right eye imaging apparatus 52r has a corresponding display 14r, PBS 20r, and ocular lens 30r. Where an optional polarizer 24 is used, as in FIG. 1B, there is a polarizer 24 provided for each eye.

Figure 5:
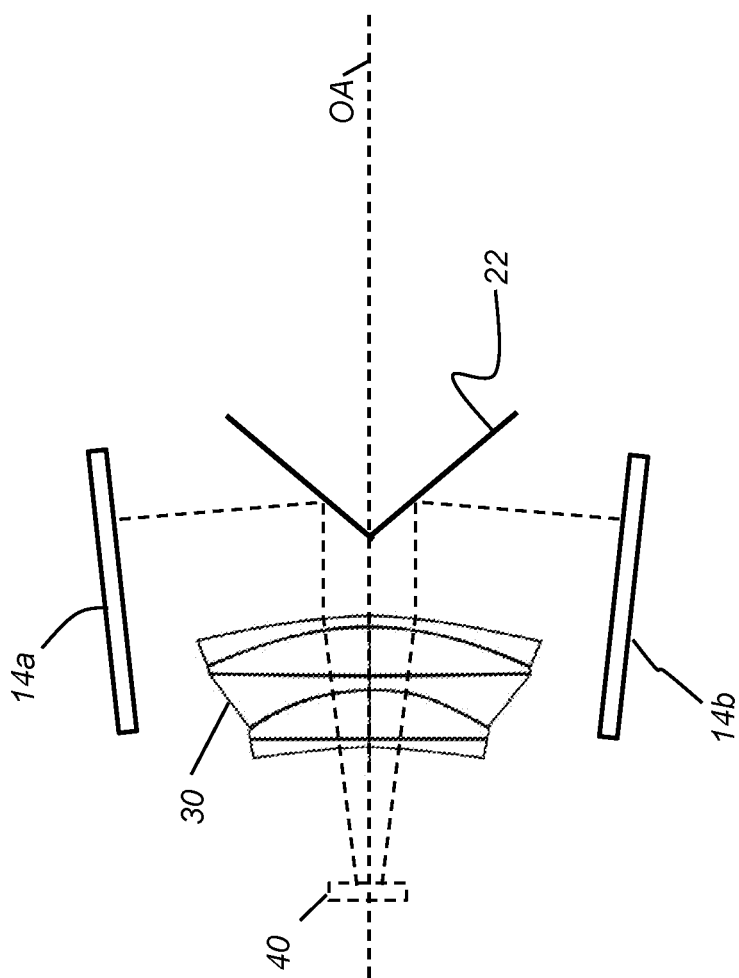
FIG. 5 is a side view schematic that shows an alternate embodiment that allows the use of two smaller displays for forming the virtual image.

The side view of FIG. 5 shows an alternate embodiment that allows the use of two smaller displays 14a and 14b as image sources for forming the virtual image. This arrangement allows increased eye relief and tilt of the display to accommodate field curvature. A chevron-shaped PBS 22, with surfaces at opposite angles with respect to an optical axis OA, splits the field between top and bottom portions. The field can alternately be split between left and right portions, with corresponding changes to component orientation.

Figure 6:
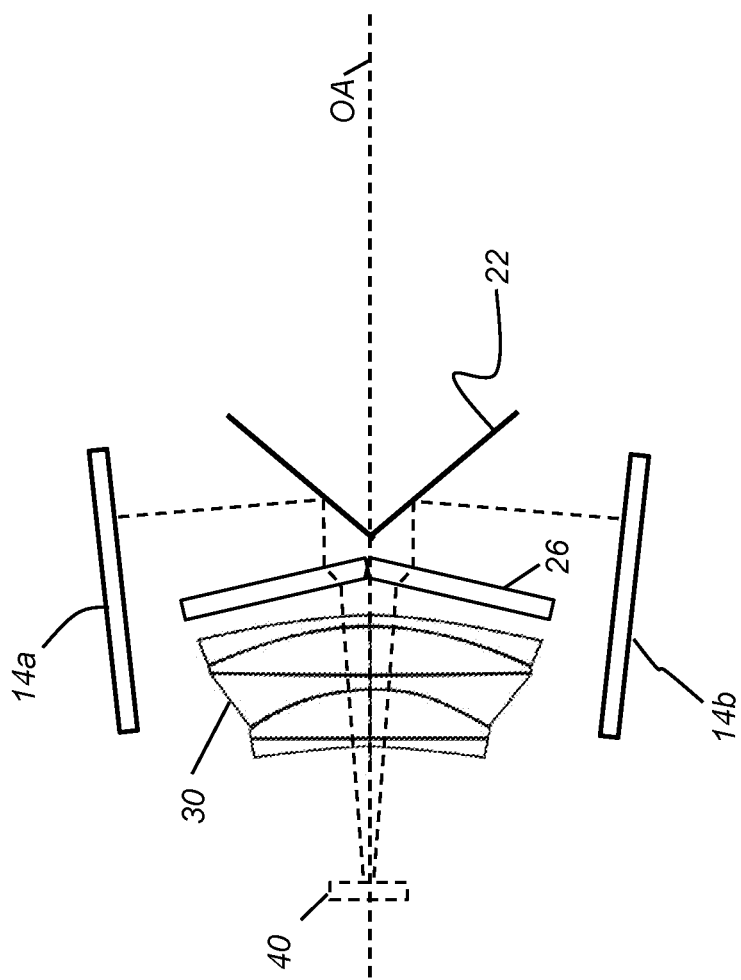
FIG. 6 is a side view schematic that shows optional use of a refractive corrector for the arrangement of FIG. 5.

The side view of FIG. 6 shows the optional use of a refractive corrector 26 for reducing or eliminating a split-screen artifact that is possible when using the chevron PBS 22. Corrector 26 is in the form of a plate, formed from glass or optical plastic. Rays vertically on each side of a central axis are shifted up or down correspondingly, away from the dividing line between top and bottom images. This helps to conceal the corner in the chevron PBS 22 so that it does not form an artifact in the generated image. The field angle is not changed, since the beams are only displaced vertically by chevron PBS 22.

Control logic processor 18 (FIG. 1A) can be any of a number of types of devices that generate image content for the emissive display. Control logic processor 18 can be a dedicated microprocessor or other device that is packaged with HMD components or that is in signal communication with components that operate the display 14.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

The invention claimed is:

1. A display apparatus comprising:
   a) a birefringent compound lens having a first optical power for light having a first polarized axis and a second optical power for light having a second polarization axis that is orthogonal to the first polarization axis, wherein the first optical power ranges between 14.3 and 50 diopters and the second optical power is less than 1 diopter and wherein the birefringent compound lens serves as an ocular and provides an eye box for a viewer;
   b) an image source that emits image-bearing light having the first polarization axis;
   and
   c) a polarization beam splitter disposed to reflect the image-bearing light of the first polarization axis toward the birefringent compound lens and further disposed to transmit, from an object scene, light having the second polarization axis.

2. The apparatus of claim 1 wherein the birefringent compound lens has two or more crystalline lens segments sandwiched between plastic or glass lens segments.

3. The apparatus of claim 2 wherein the two or more crystalline lens segments are calcite.

4. The apparatus of claim 1 wherein the image source is a liquid crystal device or an organic light emitting display.

5. The apparatus of claim 1 wherein the birefringent compound lens has no optical power for light of the second polarization axis.

6. The apparatus of claim 2 wherein both the ordinary and extraordinary refractive indices for the crystalline lens segments are within 0.05 of the refractive index for the plastic or glass lens segments.

7. The apparatus of claim 2 wherein the two or more crystalline lens segments are rutile or neodymium-doped yttrium orthovanadate.

8. The apparatus of claim 2 wherein the crystal is uniaxial with the extraordinary axis of the crystal substantially vertical.

9. The apparatus of claim 1 wherein the polarization beam splitter is a wire grid reflective polarizer.

10. The apparatus of claim 1 wherein the image source is spherically or cylindrically curved.

11. The apparatus of claim 1 wherein the image source is a first image source and further comprising a second image source and wherein the polarization beam splitter has two surfaces at opposite angles with respect to an optical axis, wherein each surface reflects light to the birefringent compound lens from one of the corresponding image sources.

12. The apparatus of claim 11 further comprising a refractive corrector disposed between the polarization beam splitter and the birefringent compound lens.

13. The apparatus of claim 2 wherein at least one of the crystalline lens segments is a liquid crystal lens.

14. A display apparatus comprising:
   right-eye and left-eye imaging apparatus, each imaging apparatus having:
   (i) a birefringent compound lens having a first optical power for light having a first polarization axis and a second optical power, for light having a second polarization axis that is orthogonal to the first polarization axis, wherein the first optical power ranges between 14.3 and 50 diopters and the second optical power is less than 1 diopter and wherein the birefringent compound lens serves as an ocular and provides an eye box for a viewer;
   (ii) an image source that forms an image having the first polarization axis; and
   (iii) a polarization beam splitter disposed to reflect image-bearing light of the first polarization axis toward the birefringent compound lens and further disposed to transmit, from a real-world field of view of the viewer, light having the second polarization axis.

15. A display apparatus comprising:
a) a birefringent compound lens, circularly symmetric and centered along an optical axis and having a first index for light having a first polarization axis and a second index of refraction, lower than the first index by at least 0.1, for light having a second polarization axis that is orthogonal to the first polarization axis, wherein the birefringent compound lens serves as an ocular and defines an eye box for a viewer, and wherein the lens optical power with respect to the first polarization axis ranges between 14.3 and 50 diopters and the lens optical power with respect to the second polarization is less than 1 diopter;
b) first and second image sources that each emit image-bearing light having the first polarization axis; and
c) a polarization beam splitter having two surfaces at opposite angles with respect to the optical axis, each surface disposed to reflect the image-bearing light from a corresponding image source into the birefringent compound lens and further disposed to transmit, from an object scene, light having the second polarization axis.

16. The display apparatus of claim 15 further comprising a glass or plastic plate disposed between the polarization beam splitter surfaces and the birefringent compound lens as a refractive corrector disposed to shift the reflected light toward the optical axis without magnification.

* * * * *